March 30, 1937.  F. J. WILKIE  2,075,319
MIRRORED FURNITURE
Filed April 20, 1935
Fig. 1.
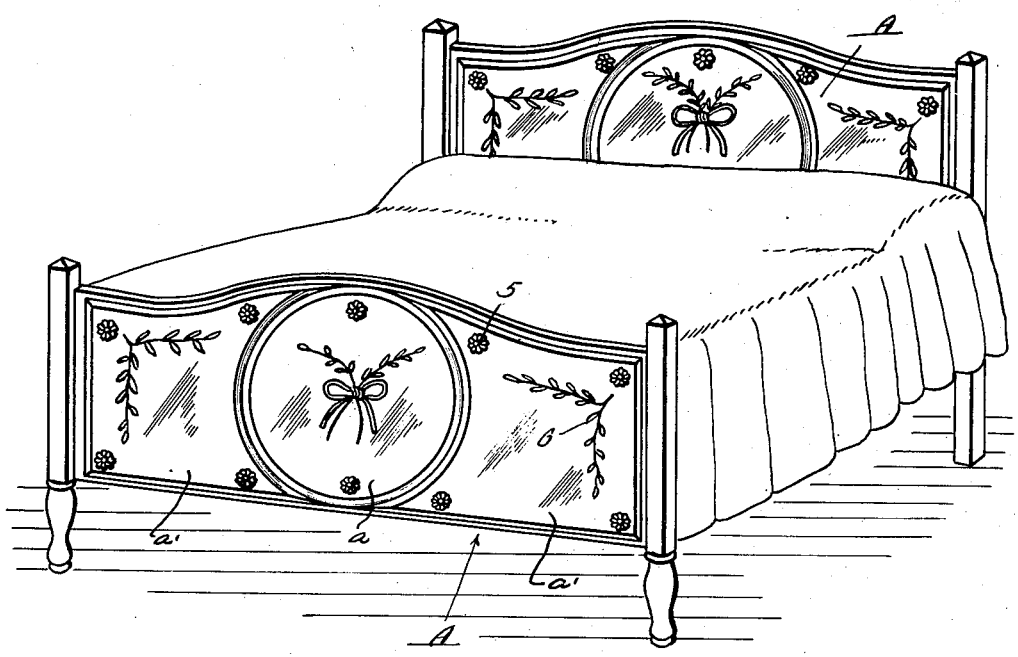
Fig. 2.
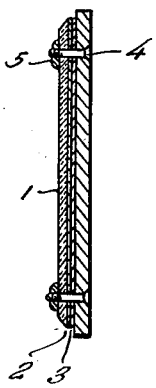
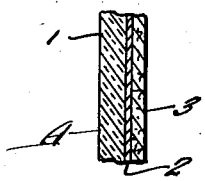
Fig. 3.
Inventor
F. J. Wilkie
By Clarence A. O'Brien
Attorney Patented Mar. 30, 1937

2,075,319

UNITED STATES PATENT OFFICE 2,075,319

MIRRORED FURNITURE

Francis J. Wilkie, Detroit, Mich.

Application April 20, 1935, Serial No. 17,497

2 Claims. (Cl. 88—85)

This invention relates to mirrored furniture, the general object of the invention being to provide means for attaching mirrors to various articles of furniture and the like and in such a manner that the mirrors will greatly add to the attractiveness of the furniture.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a perspective view of a bed constructed in accordance with this invention.

Figure 2 is a sectional view through a part of the bed showing how the mirror is attached thereto.

Figure 3 is an enlarged sectional detail view showing the mirror assembled.

As shown in these views the mirror A is composed of the glass 1 having the usual backing 2 and a sheet 3 of felt is placed on the backing, as clearly shown in Figure 3. This mirror assembly is shaped to conform to that part of the article of furniture to which it is to be attached and the assembly is held to the part by screws 4 which pass through holes in a part of the article, through the felt and backing and the glass and are then threaded into members 5 which are preferably formed of glass and made in the form of rosettes. The glass entirely covers the backing and the felt so that these parts are hidden from view and no frame is used with the mirror and as before stated the mirror is shaped to conform to the shape of that part of the furniture to which it is attached. For instance, the edges of the mirrors shown in Figure 1 conform with the shape of the foot and top parts of the bed and I prefer to make the central part $a$ of the mirror assembly part of the bed of circular form and to make the other parts $a'$ to have their inner ends snugly fit against the circular part. The mirrors are preferably engraved or otherwise treated to form the design 6.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In combination, a bed, fixed frameless mirrors covering portions of the bed and secured to said portions, each mirror including a backing covering the glass surface and a felt sheet placed between the backing and that part of the bed to which the mirror is attached to protect said part of the bed from marring, screws for directly and detachably connecting the mirror assembly to the bed to permit the mirror assembly to be removed, said screws passing through the bed and the mirror assembly and having their heads countersunk in said bed and their ends extending through the glass surface of the mirror, and nuts in the form of rosettes connected to said ends of the screws.

2. In combination, a bed, glass panels for the foot and the head of the bed, backings for the panels, felt sheets interposed between the panels and the head and the foot of the bed to prevent marring of the bed by the panels, screws for directly and detachably connecting the panels to the head and foot of the bed to permit said panels to be removed from the bed, said screws having their heads countersunk in said bed to prevent contact with the bed clothing, and having their ends extending through the panels, and nuts in the form of rosettes connected to said ends of the screws.

FRANCIS J. WILKIE.